US010602325B2

(12) United States Patent
Esdaile et al.

(10) Patent No.: US 10,602,325 B2
(45) Date of Patent: *Mar. 24, 2020

(54) TIERED NETWORK ACCESS BASED ON USER ACTION

(71) Applicant: Hewlett Packard Enterprise Development LP, Houston, TX (US)

(72) Inventors: Cameron Esdaile, Santa Clara, CA (US); Garth Benedict, Reading, MA (US); David Wilson, Santa Clara, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,481

(22) Filed: Aug. 28, 2017

(65) Prior Publication Data

US 2017/0366953 A1    Dec. 21, 2017

Related U.S. Application Data

(63) Continuation of application No. 14/266,770, filed on Apr. 30, 2014, now Pat. No. 9,749,826.

(51) Int. Cl.
| | |
|---|---|
| *H04L 12/08* | (2006.01) |
| *H04W 4/21* | (2018.01) |
| *H04L 12/927* | (2013.01) |
| *H04L 29/08* | (2006.01) |
| *H04W 48/00* | (2009.01) |
| *H04L 12/64* | (2006.01) |

(Continued)

(52) U.S. Cl.
CPC ............ *H04W 4/21* (2018.02); *H04L 12/6418* (2013.01); *H04L 47/803* (2013.01); *H04L 67/22* (2013.01); *H04W 12/08* (2013.01); *H04W 48/00* (2013.01); *H04L 63/0815* (2013.01); *H04L 63/105* (2013.01); *H04W 12/00503* (2019.01); *H04W 12/06* (2013.01)

(58) Field of Classification Search
CPC ....... H04L 67/22; H04L 47/803; H04L 63/08; G06F 21/31; G06F 9/468
See application file for complete search history.

(56) References Cited

U.S. PATENT DOCUMENTS

| | | | | |
|---|---|---|---|---|
| 7,467,212 | B2* | 12/2008 | Adams | G06F 9/468 709/206 |
| 8,671,385 | B2* | 3/2014 | Byrd | G06F 21/45 709/223 |

(Continued)

*Primary Examiner* — Kim T Nguyen
(74) *Attorney, Agent, or Firm* — Hewlett Packard Enterprise Patent Department

(57) ABSTRACT

The present disclosure discloses a method and network device for providing tiered network access based on user actions. Specifically, a network device can identify a social action performed by a user, where the social action is performed while the user is logged into a social network application. Furthermore, the network device can select a network access level of a plurality of network access levels based on the social action. Accordingly, the network device grants a client device corresponding to the user access to a network based on the selected network access level. Note that the network access level is selected from the plurality of network access levels based on a plurality of social actions performed by the user.

20 Claims, 9 Drawing Sheets

(51) Int. Cl.
*H04W 12/08* (2009.01)
*H04W 12/06* (2009.01)
*H04L 29/06* (2006.01)
*H04W 12/00* (2009.01)

(56) References Cited

U.S. PATENT DOCUMENTS

| | | | |
|---|---|---|---|
| 8,990,891 B1* | 3/2015 | Chickering | G06F 21/74 |
| | | | 726/1 |
| 9,749,826 B2* | 8/2017 | Esdaile | H04W 4/21 |
| 2006/0003796 A1* | 1/2006 | Vireday | H04W 12/08 |
| | | | 455/550.1 |
| 2008/0271109 A1* | 10/2008 | Singh | H04L 63/08 |
| | | | 726/1 |
| 2014/0143149 A1* | 5/2014 | Aissi | G06F 21/31 |
| | | | 705/44 |

* cited by examiner

SOCIAL NETWORK APPLICATION
LOGIN PROMPT
330

PLEASE LOGIN TO SOCIAL NETWORK $SN_i$

USERNAME
335

PASSWORD
338

FIG. 3B

$SN_i$ REQUEST FOR PERMISSION
340

WLAN SOCIAL NETWORK APPLICATION $SNA_i$:

THIS APPLICATION WOULD LIKE TO REQUEST PERMISSION TO [A, B, C]

*$SNA_i$ WILL USE THIS INFORMATION IN ACCORDANCE WITH THEIR RESPECTIVE TERMS OF SERVICE AND PRIVACY POLICIES.*

CANCEL
350

ACCEPT
360

FIG. 3C

$SN_1$ CAPTIVE PORTAL LOGIN CREATION
400

USE THE FORM BELOW TO MODIFY SOCIAL NETWORK AUTHENTICATION PROVIDER

PROVIDER 405

CLIENT ID 410

CLIENT SECRET 415

CONFIRM CLIENT SECRET 420

DESTINATION 425

AUTO REDIRECT 430 ☐ AUTOMATICALLY REDIRECT GUESTS TO THIS PROVIDER

ENDPOINT ATTRIBUTES 435 ☐ CREATE AN ENDPOINT ATTRIBUTE FOR EVERY ATTRIBUTE RETURNED BY THE USER

USERNAME PREFIX 440

USERNAME SUFFIX 445

ICON LABEL 450

SOCIAL LOGIN 455 ☐ ENABLE LOGIN WITH SOCIAL NETWORK CREDENTIALS

AUTHENTICATED PROVIDERS 460

ADD NEW AUTHENTICATION PROVIDER

| PROVIDER | CLIENT ID |
|---|---|
| $SN_1$ | CLIENT $ID_1$ |
| $SN_2$ | CLIENT $ID_2$ |
| $SN_3$ | CLIENT $ID_3$ |
| $SN_4$ | CLIENT $ID_4$ |

NETWORK LOGIN ACCESS 470

ALLOWED ACCESS 480

DENIED ACCESS 485

FIG. 4

SOCIAL NETWORK APPLICATION SNA,
WLAN CLIENT ID CREATION
500
WELCOME TO SN, DEVELOPER CONSOLE, USE FORM BELOW TO CREATE CLIENT ID
APPLICATION TYPE
510
● WEB APPLICATION
○ SERVICE APPLICATION
○ INSTALLED APPLICATION
AUTHORIZED JAVASCRIPT ORIGINS
520
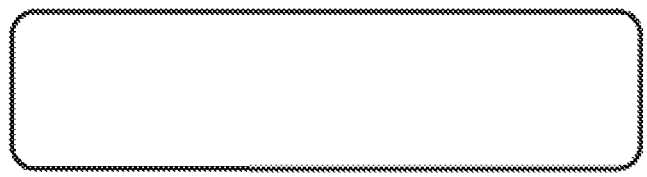
AUTHORIZED REDIRECT URL
530
CREATE CLIENT ID
540
CANCEL
545
FIG. 5A

TIERED NETWORK ACCESS BASED ON USER ACTION

FIELD

The present disclosure relates to network access management in a wireless or wired local area network (LAN). In particular, the present disclosure relates to a mechanism for providing tiered network access based on user actions in a LAN.

BACKGROUND

Wireless digital networks, such as networks operating under the current Electrical and Electronics Engineers (IEEE) 802.11 standards, are spreading in their popularity and availability. Conventionally, enterprise WLANs often use a pre-configured guest account to provide WLAN resource access to visitors or guests of the WLAN. There is no existing mechanism for providing tiered guest access to the WLAN users.

BRIEF DESCRIPTION OF THE DRAWINGS

The present disclosure may be best understood by referring to the following description and accompanying drawings that are used to illustrate embodiments of the present disclosure.

FIGS. 3A-3C illustrate exemplary user interfaces for tiered network access based on user actions according to embodiments of the present disclosure.

FIG. 4 illustrates exemplary user interface for captive portal login creation in order to provide tiered network access based on user actions according to embodiments of the present disclosure.

FIGS. 5A-5B illustrate exemplary user interface for social network application creation in order to provide tiered network access based on user actions according to embodiments of the present disclosure.

DETAILED DESCRIPTION

In the following description, several specific details are presented to provide a thorough understanding. While the context of the disclosure is directed to network access management in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disposed herein. It should be understood that this disclosure covers all modifications, equivalents, and alternatives falling within the spirit and scope of the present disclosure.

Overview

Embodiments of the present disclosure relate to network access management in a wireless local area network (WLAN). In particular, the present disclosure relates to a mechanism for providing tiered network access based on user actions in a WLAN. According to embodiments of the present disclosure, the system can identify a social action performed by a user. Note that the social action is performed while the user is logged into a social network application. Based on the social action, the system can select a network access level of a plurality of network access levels, and grant a client device corresponding to the user access to a network based on the selected network access level.

Thus, the disclosed system provides an alternative way of authenticating guests of a WLAN to the network. Instead of using a pre-configured guest account in the WLAN, the WLAN can use any pre-existing user identity in a social network (e.g., Facebook®, Twitter®, LinkedIn®, Google®, etc.) to permit the user to login to the network. Moreover, the disclosed system can provide tiered network access or differential services based on user actions performed by a particular user in the past.

Computing Environment

Figure 1:
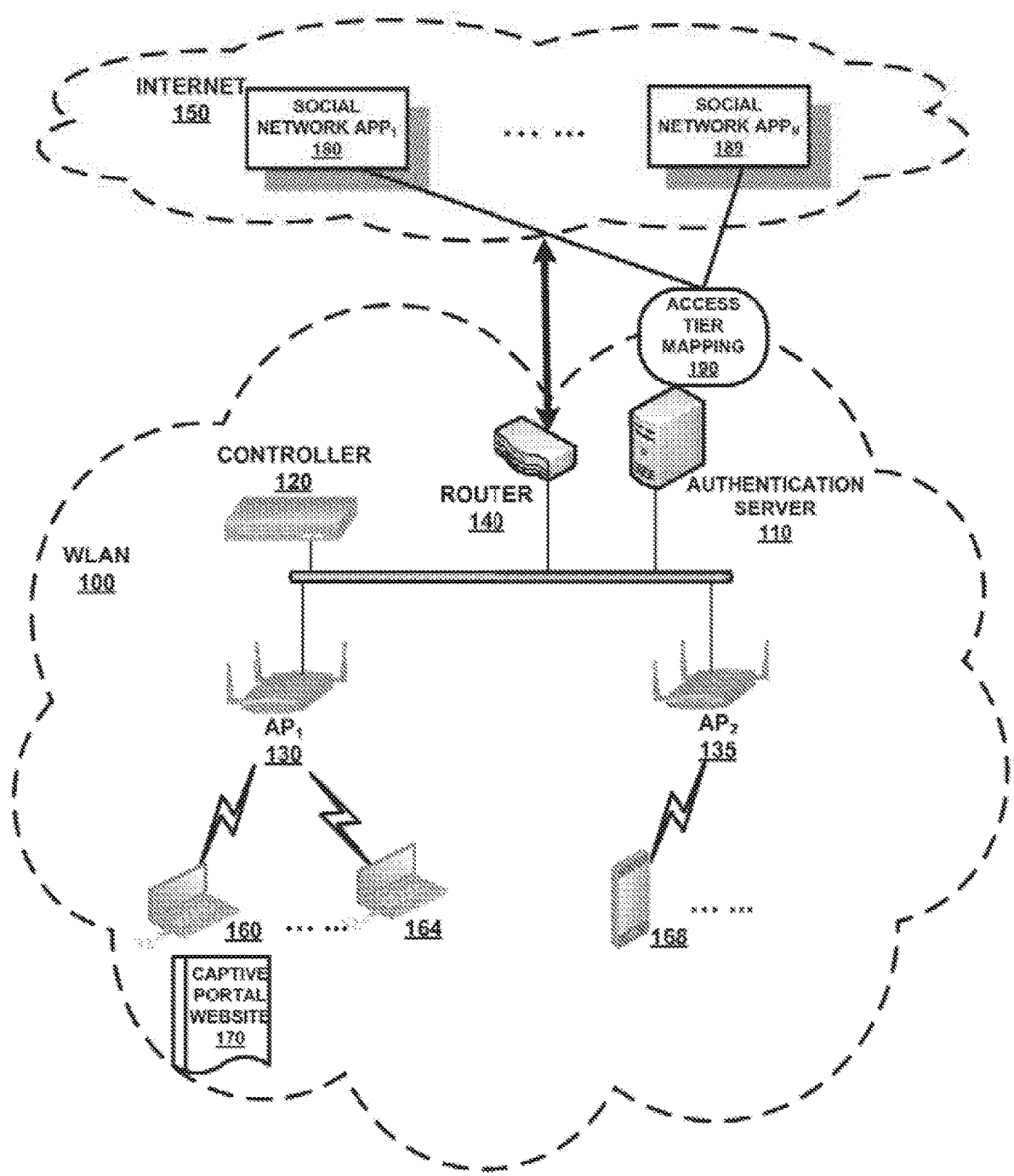
FIG. 1 shows exemplary computing environment according to embodiments of the present disclosure.

FIG. 1 shows an exemplary computing environment according to embodiments of the present disclosure. Specifically, FIG. 1 includes a controller 120, a router 140, an authentication server 110, and a plurality of access points, e.g., AP$_1$ 130 and AP$_2$ 135, in a wireless local area network (WLAN) 100. WLAN 100 may be also connected to Internet 150 or another external network via router 140. Internet 150 or external network may include one or more hosts for a number of social network applications, such as, Social Network App$_1$ 180, . . . , Social Network App$_N$ 189. Furthermore, controller 120 is communicatively coupled with one or more access points (APs), such as AP$_1$ 130 and AP$_2$ 135, to provide wireless network services by transmitting network packets.

Network according to embodiments of the present disclosure may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with AP$_1$ 130, and client devices, such as client device 168, are associated with AP$_2$ 135. Note that, client devices may be connected to the access points via wired or wireless connections.

During operations, a wireless client device, such as client device 160, client device 164, or client device 168, acting as a guest to WLAN 100, attempts to associate with a respective access point, e.g., access point AP$_1$ 130, access point AP$_2$ 135, etc. The identity of the wireless client device needs to be authenticated by the WLAN infrastructure before the respective access point can provide network access to the wireless client device. To authenticate the wireless client device, controller 120 can send an authentication request with the wireless client device's identity, e.g., a Media Access Control (MAC) address of the wireless client device, to authentication server 110. If the wireless client device is an unrecognized guest user of enterprise WLAN, authentication server 110 will cause a captive portal website 170 to be displayed at the wireless client device (e.g., client device 160).

According to embodiments of the present disclosure, in addition to username and password fields that are typically included in the captive portal website, the captive portal website may also include a number of links to social network applications to allow a user who is an existing social network user to login as a guest to the WLAN with their social network account information. When the user is not an existing social network user, the user can sign up for a social network account to login as a guest to the WLAN with their new social network account information.

Moreover, authentication server 110 can communicate with the respective social network application in Internet 150 or external network to obtain a plurality of attributes from the user's social network profile. Based on the attributes, authentication server 110 can perform an access tier mapping 180 to determine which tier of access that a user, who is successfully logged into a supported social network application (e.g., social network $app_1$ 190), will be granted. Note that the attributes can be based on a number of user actions, including social actions within a social network.

Subsequently, authentication server 110 can inform WLAN infrastructure (such as, controller 120 and/or $AP_1$ 130) of its determination regarding the appropriate tier of access to be provided to the wireless client device (e.g., client device 160). Client device 160 will then be authenticated and connected to WLAN 100 with the appropriate tier of access.

Social Network Application

Social network application generally refers to an application that allows a user to create a user entity within the application, which provides a social networking service allowing the user to connect with one or more other entities, such as users, companies, etc. A social networking service generally refers to a platform to build social networks or social relations among people who, for example, share interests, activities, backgrounds or real-life connections. A social network service consists of a representation of each user (e.g., a profile), his social links, and a variety of additional services or actions. Social networking can be web-based services that allow individuals to create a public profile, to create a list of users with whom to share connections, end view and cross the connections within the system. Social networking sites allow users to share ideas, pictures, posts, activities, events, and interests with people in their network.

Social Action

A social action generally refers to an action taken by a user. The action may have been taken by the user previously, or may be taken subsequent to logging into a social network application. In some embodiments, the social action includes an indication of interest performed by a user. For example, a WLAN guest or visitor may click "like" on a page associated with a company or other entities in a social network application.

In some embodiments, the social action may include subscribing to an entity in the social network application. For example, the WLAN guest or visitor can "follow" a particular page associated with a company or other entities in a social network application. Note that, when a user logs in to a social network application, the user may be granted basic level of guest access to WLAN. If, however, the user subscribes to or follows a particular page, the user may be granted a different class of service by the WLAN.

In some embodiments, the social action may include directly connecting to a particular entity in the social network application. For example, the WLAN guest or visitor can request to "add friend" with a company or another user entity in the social network. Also, the WLAN guest or visitor can accept an "add friend" request from another entity in the social network. Furthermore, the WLAN guest or visitor can become a "member" of a group in the social network. As another example, the WLAN guest or visitor can "like" or "follow" a company of another user entity in the social network, or perform any similar actions that convey a preference for the company or user entity in the social network.

In some embodiments, the social action may include indirectly connecting to a particular entity in the social network application. For example, the WLAN guest or visitor may be within a certain number of connections away from a particular person (e.g., an employee of a company) or an entity (e.g., a company or user interest group), etc. In the example of a LinkedIn® user, the guest user may be granted different tiers of network access levels based on whether the user is a 2nd connection or 3rd connection to an employee of the company. For instance, a network administrator may set up a mapping rule to grant VIP access to all guest users who are two connections away from the CEO of the company on LinkedIn®. The number of connections can be calculated using metrics such as a distance in a social network application.

In some embodiments, the social action may include indicating presence at a particular location identified in the social network application. For example, the WLAN guest or user may check in at a location on a social network application. The location may refer to a venue or a geo-location that corresponds to a bounded physical area. For example, the location may be a restaurant, a park, a city, an airport, a particular floor of a building, a few disjointed areas on a university campus, etc.

Network Access Levels

A network access level can be selected subsequent to the user obtaining access to the network. Note that, the network access levels here refer to non-zero access levels. Therefore, differentiated network access levels according to embodiments of the present disclosure extend beyond grant versus deny a user's access. They include a granular level of control over the user's access to WLAN resources as a guest or visitor. For example, a guest or visitor user may be able to connect to the web. However, the network access levels, including but not limited to, different bandwidths, speeds, data, protocols, resources, etc., are determined based on prior social action(s) performed by the user. For example, a guest user can surf websites and execute searches at a low speed if authenticated via a pre-configured guest account to WLAN. However, if the user logs in to a supported social network application, and a particular social action (e.g., following a company on Twitter®) is detected, then the user will be granted WLAN access with increased data transmission rates or speeds.

Each of the plurality of network access levels allows for access to at least one network resource. For example, if a guest user only logs in with a pre-contoured guest account to the WLAN, the guest user gets web access only. However, if the guest user logs into a social network application and performs a particular social action, the guest user will also get access to other services provided by enterprise servers and/or devices, for example, printers, projectors, etc.

Each of the plurality of network access levels correspond to different levels of non-zero bandwidth levels. For example, if a guest user only logs in via pre-configured guest account to WLAN, the guest user gets low bandwidth access only. However, if the guest user logs into a social network application and performs a particular social action, the guest user will also get access with higher bandwidth.

Each of the plurality of network access levels correspond to different levels of non-zero data allowances. For example, if a guest user stays at a hotel, the guest may get a one hour of free Wi-Fi access. However, if the guest user logs into his/her Facebook account and "likes" the hotel's page on Facebook, the guest user may receive a full day of free Wi-Fi access.

Each of the plurality of network access levels correspond to different levels of non-zero data download speeds and/or non-zero data upload speeds. For example, if a guest user only logs in via pre-configured guest account to WLAN, the guest user gets a basic level of data download and/or upload speed. However, if the guest user logs into a social network application and performs a particular social action, the guest user will be granted higher speeds or better quality of services when downloading and/or uploading data.

Each of the plurality of network access levels correspond to different protocols that may be used for obtaining access to resources on the network. For example, if a guest user only logs in via pre-configured guest account to WLAN, the guest user gets web access only. However, if the guest user logs into a social network application and performs a particular social action, the guest user will also get enterprise access, which will allow the guest user to access portal pages, or have WLAN access using alternative protocols, e.g., via virtual private network (VPN), etc.

Determining Social Action of User

Embodiments of the present disclosure allow a network administrator to define a set of social and/or user actions, and provide a mapping between different social/user actions to a network access level in a tiered network access authentication framework. Here, the tiered network access authentication framework has at least one other access level between zero access and full guest access. Specifically, the disclosed system provides a notification to the user via a captive portal application that the user may be able to enjoy a higher level of network access than his/her current level, if the user performs a particular social actions. For example, the system can prompt a user to perform an action to obtain a particular network access level, e.g., by offering the user high speed access in response to the user "liking" a company page on Facebook®.

Also, the disclosed system uses an Application Programmable Interface (API) to access prior social actions performed by user within the social network application. Based on the social/user action performed by a WLAN guest, the system can determine which tier of network access level shall be granted to the user and grant a client device corresponding to the user the network access accordingly. Granting access based on a selected network access level includes modifying the current network access level to the selected network access level.

Figure 2:
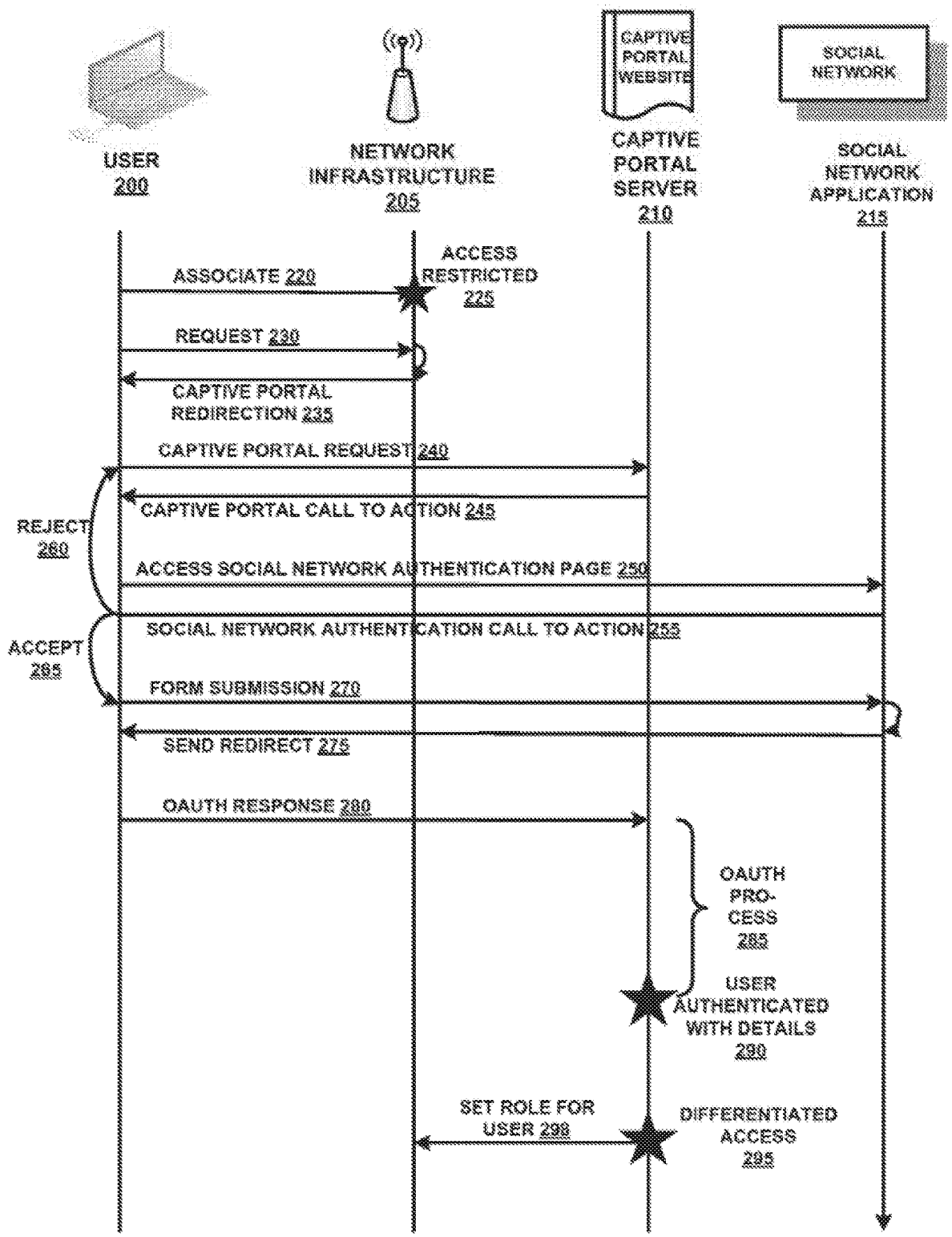
FIG. 2 illustrates exemplary sequence diagram for tiered network access based on user actions according to embodiments of the present disclosure.

FIG. 2 illustrates an exemplary sequence diagram for tiered network access based on user actions according to embodiments of the present disclosure. FIG. 2 includes at least a user 200, a network infrastructure 205, a captive portal server 210, and a social network application 215. In this example, user 200 is a guest user who attempts to log in to a WLAN provided by network infrastructure 205. User 200 is then redirected to a portal web page hosted by captive portal server 210. The portal web page includes prompts for user 200's guest username and/or password, as well as a number of login links that permit user 200 to log in the WLAN using pre-existing identities in a supported social network application 215.

Note that, although only one social network application is illustrated in this example, the system disclosed herein can create a social network application for each of the supported social networks. Also, when the system receives an authentication request from the user for accessing the WLAN, the system can use similar mechanisms as described below to retrieve attributes from each of the social network applications corresponding to different social networks, select a network access level based on a prior user action indicated by the retrieved attributes, and grant differentiated network access to users who are successfully authenticated by the supported social networks.

Specifically, WLAN guest user 200 initially associates 220 to network infrastructure 205, for example, by transmitting an association request to an access point in the WLAN. Because, as a guest to WLAN, user 200 is not previously known to the network, network infrastructure 205 will determine that user 200's access to the WLAN is access restricted 225. This means that user 200 does not have full network access, but has only limited network access that is capable of being redirected to a captive portal website hosted by captive portal server 210. Thus, for any request 230 transmitted from user 200 to network infrastructure 205, network infrastructure 205 will transmit a captive portal redirection 235 based on the determination of restricted access 235 for user 200, instead of forwarding request 230 to its destination address.

Thereafter, user 200 will transmit a captive portal request 240 upon receiving captive portal redirection 235. In some embodiments, captive portal redirection is implicit and automatically handled by user 200's device operating platform. In some embodiments, captive portal redirection 235 will be handled manually to generate captive portal request 240. Either way, user 200 will be presented with a web browser showing a captive portal website that includes a web form for authentication as well as a number of links to supported social network applications. An exemplary captive portal website is described in details below in reference to FIG. 3A. Note that, captive portal website may include a captive portal call to action 245 regarding the social network application, for example, "Please login and follow us on Twitter to receive 4 hour complimentary network access."

When user 200 clicks on the social network application login link in response to captive portal call to action 245, user 200 will access social network authentication page 250. In response, social network application 215 will present to user 200 a social network authentication call to action 255. An exemplary social network application authentication call to action 255 (e.g., a login interface) is described in details below in reference to FIG. 3B. If user 200 rejects 260 the social network authentication call to action 255, user 200 will be redirected to the captive portal website.

On the other hand, if user 200 accepts 265 the social network authentication call to action 255, for example, by entering the correct social network login credentials, user 200 will be presented a form that is specific to social network application 215 and configured by an administrator of social network application 215. An exemplary interface for social network application form is described in details below in reference to FIG. 3C. Note that, the form includes a number of user profile attributes that social network application 215 requests to access. Once user submits the form with form submission 270, social network application 215 will send redirection 275. Again, if user 200 clicks the "cancel" button with form submission 270, user 200 will be redirected to the captive portal website.

Nevertheless, if user 200 clicks "accept" button to allow social network application 215 to access his or her social network user profile attributes specified in the form, user 200 will be redirected to a standardized social network authorization process, e.g., OAuth protocol by transmitting an OAuth response 280. Specifically, OAuth protocol is an open protocol that allows secure authorization in a simple and standard method from web, mobile, and/or desktop applications. OAuth 2.0 authorization framework enables a third-party application to obtain limited access to an HTTP service for publishing and interacting with protected data in a social network. For example, here, captive portal 210 can interact with social network application 215 using a shared secret to complete OAuth process 285. Upon completion of OAuth process 235, captive portal 210 will obtain user authenticated status with details 290 that include a plurality of user profile attribute values indicating one or more of prior user actions performed in the social network. Based on the plurality of user profile attribute values, captive portal 210 can determine a differentiated network access level 295, and set the role for the user accordingly 298. Thereafter, network infrastructure 210 will learn about the user profile attribute values.

Figure 3A:
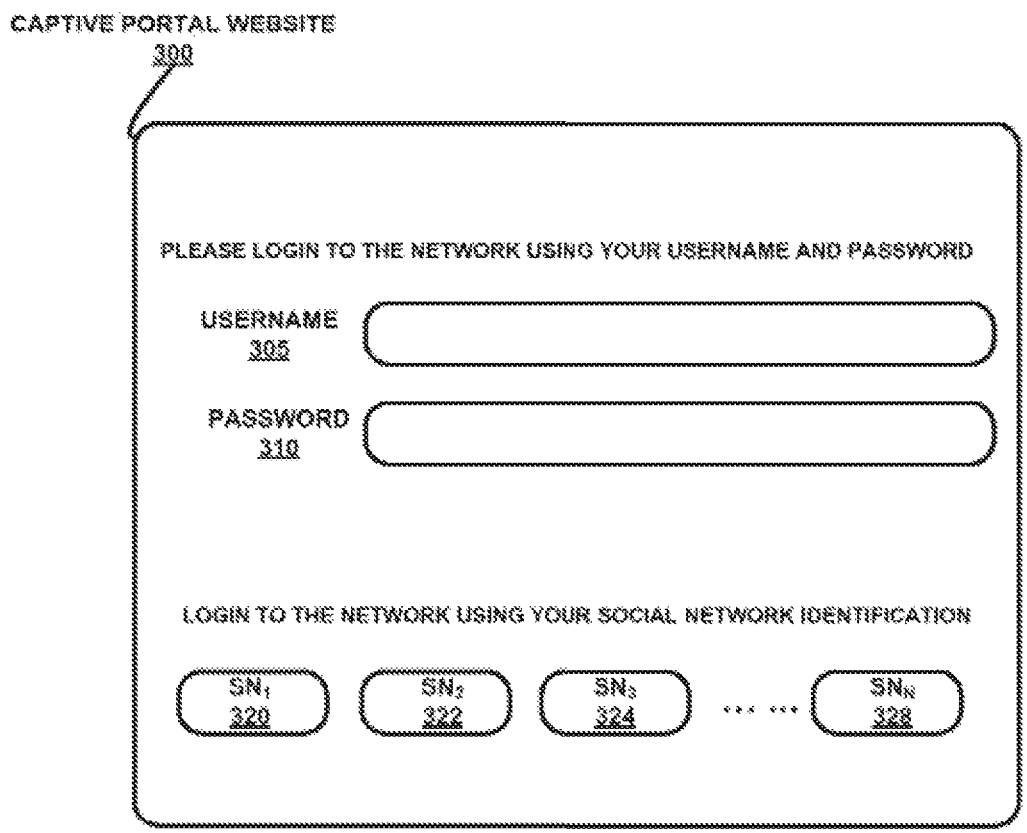

FIGS. 3A-3C illustrate exemplary user interfaces for tiered network access based on user actions according to embodiments of the present disclosure. In particular, FIG. 3A illustrates an exemplary captive portal website that a guest user sees when the user attempts to access the WLAN. Captive portal website 300 includes a field for the user to enter username 305 and password 310 respectively. This allows the user to be authenticated to access the WLAN via a pre-configured guest account that the user may obtain from a system administrator, IT personnel, a sponsor in the enterprise, etc. In addition, captive portal website provides additional links, such as, $SN_1$ 320, $SN_2$ 322, $SN_3$ 324, ..., $SN_N$ 328, which allow the user to log in to the WLAN using a pre-existing identity in any of the supported social network applications.

FIG. 3B illustrates an exemplary social network application login interface alter the user chooses to login to the WLAN via a social network application. For example, the user will be displayed with social network application login prompt 330 if the user clicks on $SN_1$ 320 in FIG. 3A. Social network application login prompt 330 includes at least a field for the user so enter username 335 and password 338 respectively. The user may enter their social network application credentials in these fields to be authenticated by a supported social network application.

FIG. 3C illustrates an exemplary request for permission by social network application. Assuming that the user selects $SN_1$ 320 in FIG. 3A and enters his/her correct $SN_1$ credentials in FIG. 3B, the user will be prompted with an interface illustrated in FIG. 3C during the first time the user logs in to the social network application $SN_1$. $SN_1$ request for permission 340 includes attributes (e.g., [A, B, C]) from the user's profile in the social network $SN_1$, which the WLAN social network application $SNA_1$ requests access to. The user can either select cancel 350 to decline $SNA_1$'s access to the listed attributes, or select accept 360 to allow $SNA_1$'s access to the listed attributes.

FIG. 4 illustrates exemplary user interface for captive portal login creation in order to provide tiered network access based on user actions according to embodiments of the present disclosure. A network administrator may use the form illustrated in FIG. 4 to create and/or modify a social network authentication provider. $SN_1$ captive portal login creation form 400 includes at least the following fields: a provider 405, a client identifier (client ID) 410, a client secret 415 and confirmation of the client secret 420, a destination 425, an automatic redirection option 430, an endpoint attributes option 435, a username prefix 440 and/or a username suffix 445, an icon label 450, etc.

Specifically, provider 405 can be any social network provider capable of providing authentication via an API, such as Google+®, YouTube®, LinkedIn®, Pinterest®, Tumblr®, Twitter®, etc. Client ID 410 refers to the WLAN client application identity associated to the selected provider. For example, when creating $SNA_1$ for social network Google+®, the client ID may be 641031766090.apps-.googleusercontent.com. Client secret 415 refers to a shared secret between the WLAN client application and the provider. Further, confirm client secret 420 is used to confirm that the correct client secret has been entered in client secret 415. If the values entered into client secret 415 and confirm client secret 420 do not match each other, the system will display an error message. Destination 425 refers to a Universal Resource Locator (URL) that guests authenticating with this provider will be redirected to upon logging in to the WLAN.

Automatic redirection option 430, endpoint attributes option 435, username prefix 440, username suffix 445, and an icon label 450 are optional fields. Checking automatic redirection option 430 will remove the system's ability to support local logins or any other providers. Thus, all guest users to WLAN will be automatically redirected to this social network provider for login authentications. When endpoint attributes option 435 is checked, the system creates an endpoint attribute for every attribute returned by the user. Note that cresting endpoint attributes is needed if the network administrator also creates specialized enforcement policies on the endpoint attributes.

Text entered into username prefix 440 can be prepended to all usernames, and text entered into username suffix 445 can be appended to all usernames. A prefix or suffix can be useful if an administrator configures the system to provide a means to login using a variety of social network providers. Icon label 450 allows for designation of a file path where the icon file can be uploaded and used to override the default label for the social network provider's icon.

Moreover, the social login section of $SN_1$ captive portal login creation form 400 optionally presents guests with various social login options. For example, when social login 455 is selected, the system will enable login with social network credentials. Authenticated providers 460 allow the administrator to add one or more social network providers to the provider list. Each provider in the provider list corresponds to a client ID that uniquely identifies the WLAN social network application's (e.g., $SNA_1$) unique identifier in the social network.

In addition, $SN_1$ captive portal login creation form 400 also includes a network login access section 470 that controls access to the login page. Specifically, allowed access field 480 usually specifies the IP addresses and networks from which logins are permitted. On the other hand, denied access field 485 usually specifies the IP addresses and networks that are denied login access.

Figure 5B:
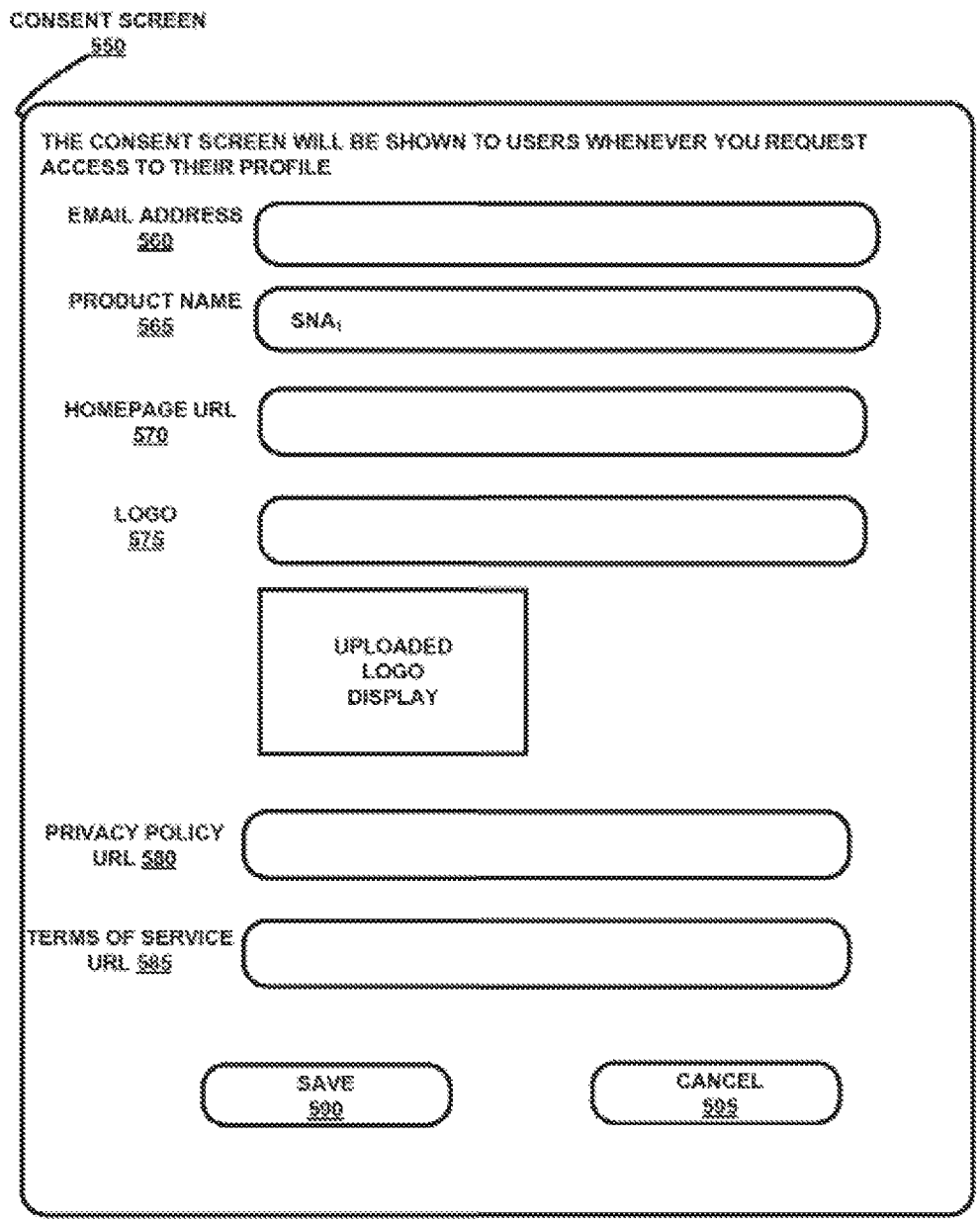

FIGS. 5A-5B illustrate exemplary user interface for social network application creation in order to provide tiered network access based on user actions according to embodiments of the present disclosure. Specifically, to create a social network application SNA$_1$, an administrator needs to first create a client ID through the social network SN$_1$'s API. FIG. 5A illustrates an exemplary social network application SNA$_1$ WLAN client ID creation interface 500. SNA1 WLAN client ID creation interface 500 includes at least an application type 510, authorized JavaScript origins 520, and authorized redirect URL 530. Here, application type 510 can be, but is not limited to, a web application that is accessed by web browsers over a network, a service application that calls the social network APIs on behalf of SNA$_1$ instead of an end-user, and/or an installed application that runs on a desktop computer or handheld device. Authorized JavaScript origins 520 can specify the location of the login website with the JavaScript login form. Authorized redirect URL 530 specifies the location of the website that authorized users will be redirected to upon logging into the WLAN using their social network credentials. Furthermore, SNA$_1$ WLAN client ID creation interface 500 includes a create client ID button 540 and a cancel button 545. The filled form will be submitted to social network SN$_1$'s API if the administrator clicks create client ID button 540. However, the form draft will be canceled if the administrator clicks cancel button 545.

Next, the administrator needs to provide consent screen configurations 550. The consent screen will be shown to users whenever SNA$_1$ is requesting access to the user's social network profile attributes. Specifically, consent screen configurations 550 include at least the following fields: email address 560, product name 565, homepage URL 570, logo 575, privacy policy URL 580, terms of service URL 585, etc. Email address 560 specifies the contact person for the social network SN$_1$ for communications regarding WLAN social network application SNA$_1$. Product name 565 specifies the name for SNA$_1$. Logo 575 allows the administrator of SNA$_1$ to upload a customized logo for the SNA$_1$, which can be shown to the users of SN$_1$. If the administrator selects a customized logo, the logo can be displayed in the uploaded logo display area. Furthermore, homepage URL 570 specifies the location of the homepage for SNA$_1$ that may include a description of SNA$_1$; privacy policy URL 580 specifies the location of the legal privacy policy that the user of SNA$_1$ consents to by using SNA$_1$; terms of service URL 585 species the location of the terms of service for SNA$_1$, etc. Also, consent screen conjurations 500 include a save button 590 and a cancel button 595. The configurations will be saved if the administrator clicks create client ID button 590. However, the form draft will be canceled if the administrator clicks cancel button 595.

Additional user attributes and/or actions used for providing differentiated network access levels may include, but are not limited to, survey information, user's past actions during prior log-ins, the number of times the user has logged in at the particular location, the type of data that the user transmits, the entities with which the user has communicated in the past (e.g., CEO), the user role (for example, who the user is connected with; what the user profiles are; when, where, and/or why the user performs an action, etc.), usage patterns, which physical location the user comes from, which virtual location the user visits from (e.g., using a link from a particular website), the type of device the user uses, etc.

Process for Tiered Network Access Based on User Actions

Figure 6:
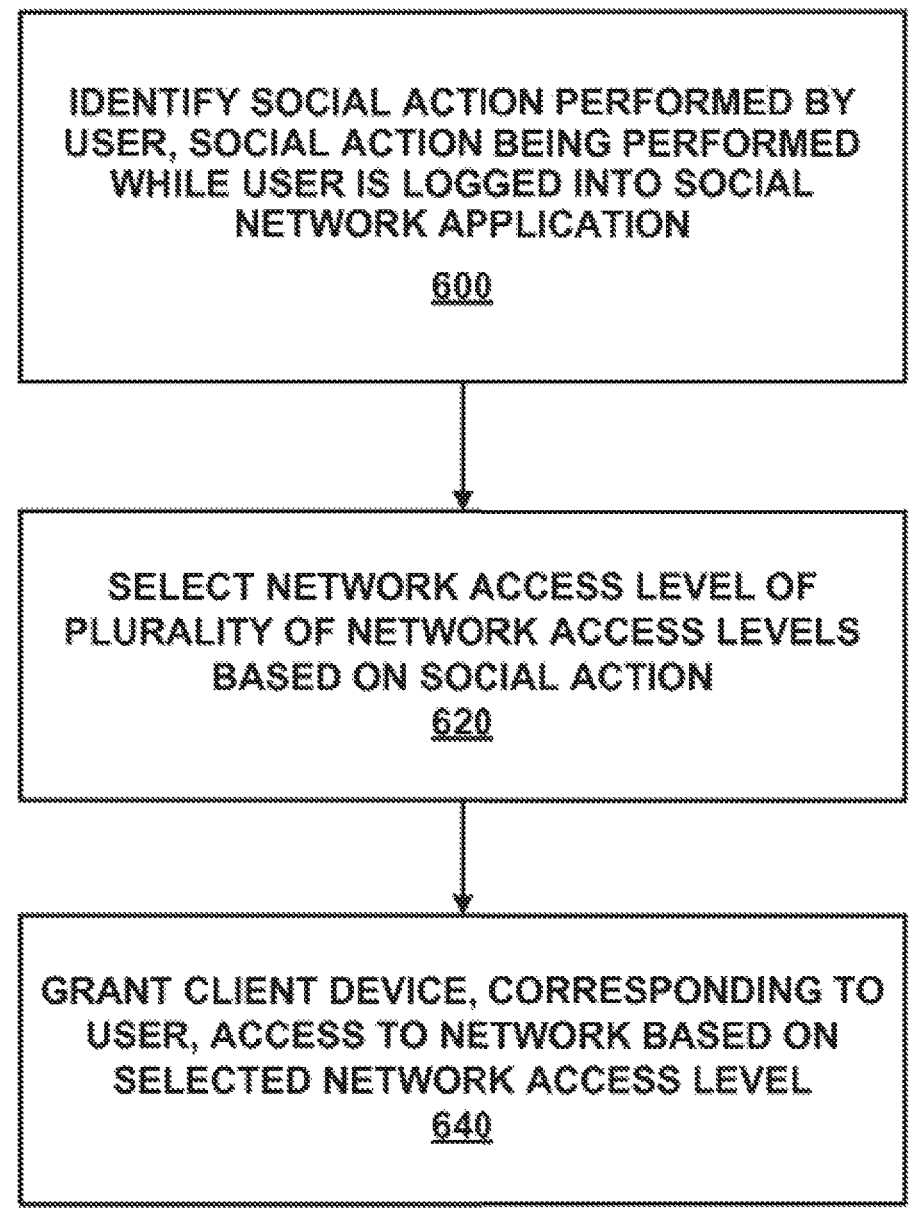
FIG. 6 illustrates an exemplary process for tiered network access based on user actions according to embodiments of the present disclosure.

FIG. 6 illustrates an exemplary process for tiered network access based on user actions according to embodiments of the present disclosure. During operations, a network device identifies a social action performed by a user, where the social action is being performed while the user is logged into a social network application (operation 600). Further, the network device selects a network access level of a plurality of network access levels based on the social action (operation 620). Accordingly, the network device grants a client device corresponding to the user access to a network based on the selected network access level (operation 640).

In some embodiment, the social action includes an indication of interest performed by a user. In some embodiments, the social action includes subscribing to an entity in the social network application. In some embodiments, the social action includes directly connecting to a particular entity in the social network application. In some embodiments, the social action includes indirectly connecting to a particular entity in the social network application. In some embodiments, the social action includes indicating presence at a particular location identified in the social network application.

In some embodiments, the network access level is selected subsequent to the user obtaining access to the network. In some embodiments, each of the plurality of network access levels allows for access to at least one network resource. In some embodiments, each of the plurality of network access levels corresponds to different levels of non-zero bandwidth levels. In some embodiments, each of the plurality of network access levels corresponds to different levels of non-zero data allowances. In some embodiments, each of the plurality of network access levels corresponds to different levels of non-zero data download speeds and/or non-zero data upload speeds. Here, non-zero data download/upload speeds generally refer to providing at least one data download or upload speed other than zero or highest speed level. In some embodiments, each of the plurality of network access levels corresponds to different protocols that may be used for obtaining access to resources on the network.

Note that, the network may include resources on the World Wide Web (WWW) or resources on a Local Area Network (LAN). Furthermore, granting the client device access to a network based on the selected network access level may include modifying a current non-zero network access level to the selected network access level.

In some embodiments, the network access level is selected from the plurality of network access levels based on a plurality of social actions performed by the user. Each of the plurality of social actions is performed on a respective social network application of a plurality of social network applications. Also, identifying the social action may include using an API associated with the social network application. In some embodiments, each of the plurality of social actions is performed on the same social network application.

In some embodiments, prior to identifying the social action performed by the user, the disclosed system further prompts the user to perform the social action. For example, the disclosed system may prompt the user to "like" a company's page in a social network without specifying a reward. In some embodiments, prior to identifying the social action performed by the user, the disclosed system prompts the user to perform the social action for obtaining said network access level of the plurality of network access levels. For example, the disclosed system may prompt the user to "like" a company's page in a social network in order to obtain a higher than basic level of WLAN guest access as a reward.

System for Tiered Network Access Based on User Actions

Figure 7:
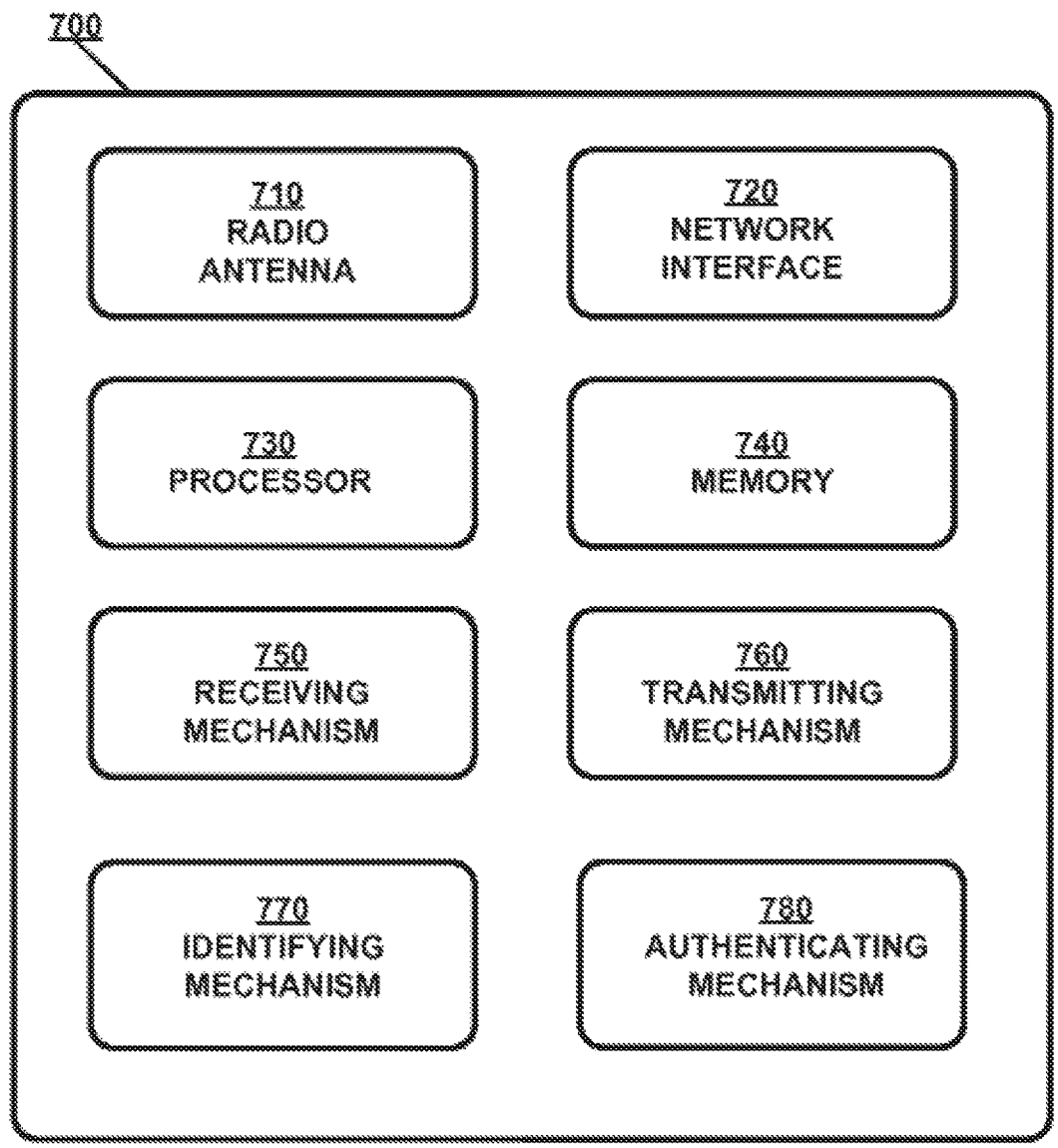
FIG. 7 is a block diagram illustrating an exemplary system for tiered network access based on user actions according to embodiments of the present disclosure.

FIG. 7 is a block diagram illustrating a system for tiered network access based on user actions according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, an identifying mechanism 770, and an authenticating mechanism 780, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexors, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on.

Transmitting mechanism 760 generally transmits messages, which include, but are not limited to, requests and/or responses, beacon frames, management frames, control path frames, and so on.

Identifying mechanism 770 generally identifies social actions performed by users. Specifically, in some embodiments, the social actions may include an indication of interest performed by a user, a subscription to an entity in the social network application, a direct connection to a particular entity in the social network application, an indirect connection to a particular entity in the social network application, a presence at a particular location identified in the social network application, etc.

Furthermore, before identifying mechanism 770 identifies a social action performed by a user, identifying mechanism 770 can cause a prompt to the user requesting the user to perform a particular social action. In some embodiments, the prompt to the user indicates that performing the social action will allow the user to obtain a particular network access level of the plurality of network access levels.

Here, the network may include resources on the World Wide Web (WWW) or resources on a Local Area Network (LAN). Also, identifying mechanism 770 may use an API associated with the social network application. In some embodiments, each of the plurality of social actions is performed on the same social network application.

Authenticating mechanism 780 generally authenticates a guest user to a selected level of WLAN access. Specifically, authenticating mechanism 780 can select a network access level of a plurality of network access levels based on a social action performed by a user. In some embodiments, the network access level is selected from the plurality of network access levels based on a plurality of social actions performed by the user. Each of the plurality of social actions is performed on a respective social network application of a plurality of social network applications.

Furthermore, authenticating mechanism 780 can grant a client device corresponding to the user access to the network based on the selected network access level. Note that, authenticating mechanism 780 may grant the client device access by modifying a current non-zero network access level to the selected network access level.

In some embodiments, the network access level is selected subsequent to the user obtaining access to the network. In some embodiments, each of the plurality of network access levels allows for access to at least one network resource. In some embodiments, each of the plurality of network access levels corresponds to different levels of non-zero bandwidth levels. Here, non-zero bandwidth levels generally refer to providing at least one bandwidth level other than zero or highest bandwidth level. In some embodiments, each of the plurality of network access levels corresponds to different levels of non-zero data allowances. In some embodiments, each of the plurality of network access levels corresponds to different levels of non-zero data download speeds and/or non-zero data upload speeds. In some embodiments, each of the plurality of network access levels corresponds to different protocols that may be used for obtaining access to resources on the network.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capably to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g. any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area while still staying connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processor to perform tiered access management:
   identify, for a network device of a wireless local area network (WLAN) and using an Application Programmable Interface (API), a social action performed by a user on a social network application on a client device while currently or while having been previously logged into the social network application;
   select, by the network device and based at least on the identified social action, a WLAN access level among a plurality of WLAN access levels for the client device; and
   authenticate, by the network device, the client device to the WLAN according to the selected WLAN access level.

2. The non-transitory computer readable medium of claim 1, further comprising causing, via a captive portal website, a link to the social network application to be displayed on the client device which allows the user to log in to the WLAN using a pre-existing identity in the social network application.

3. The non-transitory computer readable medium of claim 2, further comprising requesting performance of a specific social action on the social network application to authenticate the client device to the WLAN.

4. The non-transitory computer readable medium of claim 3, including instruction to prompt the user to perform the specific social action prior to identifying the social action performed by the user.

5. The non-transitory computer readable medium of claim 1, wherein the social action comprises a specific social action performed on the client device by the user while the user is currently or was previously logged into the social network application.

6. The non-transitory computer readable medium of claim 4, wherein the specific social action comprises subscribing to an entity in the social network application.

7. The non-transitory computer readable medium of claim 1, wherein the WLAN access level is selected from the plurality of WLAN access levels subsequent to the user obtaining access to the WLAN via a pre-configured guest account.

8. The non-transitory computer readable medium of claim 1, wherein each WLAN access level corresponds to a different data transmission speed or a different data transmission quantity.

9. The non-transitory computer readable medium of claim 8, wherein the different data transmission speed and the different data transmission quantity comprises allowed access to different network resources, different levels of non-zero bandwidth, different levels of non-zero data allowance, different levels of non-zero data download speeds, different levels of non-zero data upload speeds, obtaining access to network resources using different protocols, or combinations thereof.

10. The non-transitory computer readable medium of claim 1, wherein each WLAN access level of the plurality of WLAN access levels is selected from the plurality of WLAN access levels based on a plurality of social actions performed by the user.

11. The non-transitory computer readable medium of claim 10, wherein each of the plurality of social actions are performed on a respective social network application of a plurality of social network applications or wherein each of the plurality of social actions is performed on a same social network application.

12. A method, comprising:
   causing, by a network device of a wireless local area network (WLAN), a link to a social network application to be displayed on a client device;
   requesting performance of a specific social action on the social network application to authenticate the client device to the WLAN while a user of the client device is logged into the social network application through the client device;

identifying for the network device, using an Application Programmable Interface (API), the specific social action performed on the social network application on the client device;

selecting, by the network device and based at least on the identified specific social action, a WLAN access level among a plurality of WLAN access levels for the client device; and authenticating, by the network device, the client device to the WLAN according to the selected WLAN access level.

13. The method of claim 12, further comprising causing the link to be displayed via a captive portal website.

14. The method of claim 13, wherein the captive portal website includes a username field and a password field for the user to fill the username field and the password field respectively, granting the user, an access to the WLAN via a pre-configured guest account.

15. The method of claim 14, subsequent to granting access via the pre-configured guest account, authenticating the client device to the WLAN according to the selected WLAN access level.

16. The method of claim 12, further comprising identifying, using the API, a prior social action performed by the user during a prior log-in.

17. The method of claim 16, further comprising selecting the WLAN access level based at least on the prior social action.

18. A network device of a wireless local area network (WLAN), comprising:

a receiving mechanism configured to receive a network message from a client device coupled to the WLAN;

an identifying mechanism configured to identify social actions performed by a user on a social network application on the client device while the user is logged into the social network application through the client device based on the received network message, and an authenticating mechanism configured to:

based at least on the identified social actions, select a WLAN access level among a plurality of WLAN access levels for the client device; and authenticate the client device to the WLAN according to the selected WLAN access level.

19. The network device of claim 18, wherein the network device is an access point.

20. The network device of claim 18, wherein the network device is a WLAN controller.

* * * * *